United States Patent
Takatani

(10) Patent No.: US 12,266,482 B2
(45) Date of Patent: Apr. 1, 2025

(54) ELECTROLYTIC CAPACITOR AND METHOD FOR PRODUCING SAME

(71) Applicant: Panasonic Intellectual Property Management Co., Ltd., Osaka (JP)

(72) Inventor: Kazuhiro Takatani, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 268 days.

(21) Appl. No.: 17/815,261

(22) Filed: Jul. 27, 2022

(65) Prior Publication Data

US 2022/0367121 A1 Nov. 17, 2022

Related U.S. Application Data

(63) Continuation of application No. PCT/JP2021/006350, filed on Feb. 19, 2021.

(30) Foreign Application Priority Data

Feb. 28, 2020 (JP) .................................. 2020-034053

(51) Int. Cl.
*H01G 9/028* (2006.01)
*H01G 9/00* (2006.01)
*H01G 9/035* (2006.01)
*H01G 9/048* (2006.01)

(52) U.S. Cl.
CPC ............ *H01G 9/028* (2013.01); *H01G 9/0032* (2013.01); *H01G 9/035* (2013.01); *H01G 9/048* (2013.01)

(58) Field of Classification Search
None
See application file for complete search history.

(56) References Cited

U.S. PATENT DOCUMENTS

| | | | |
|---|---|---|---|
| 2010/0107386 A1 | 5/2010 | Furukawa et al. | |
| 2013/0261261 A1 | 10/2013 | Lovenich | |
| 2014/0334066 A1 | 11/2014 | Sugihara et al. | |
| 2018/0197685 A1* | 7/2018 | Tsubaki | H01G 9/0032 |
| 2018/0233292 A1* | 8/2018 | Tsubaki | H01G 9/035 |
| 2018/0277312 A1 | 9/2018 | Tsubaki et al. | |

FOREIGN PATENT DOCUMENTS

| | | |
|---|---|---|
| JP | 2011-228636 | 11/2011 |
| JP | 2013-539806 | 10/2013 |
| JP | 2013-243393 | 12/2013 |
| WO | 2013/094462 | 6/2013 |
| WO | 2017/094242 | 6/2017 |

OTHER PUBLICATIONS

International Search Report of PCT application No. PCT/JP2021/006350 dated May 11, 2021.

\* cited by examiner

*Primary Examiner* — Eric W Thomas
(74) *Attorney, Agent, or Firm* — Rimon P.C.

(57) ABSTRACT

An electrolytic capacitor includes a capacitor element. The capacitor element includes an anode body including a dielectric layer on a surface of the anode body, and a conductive polymer covering a part of the dielectric layer. The conductive polymer contains a first monomer unit corresponding to a 3,4-ethylenedioxythiophene compound and a second monomer unit corresponding to a 3,4-dialkoxythiophene compound.

4 Claims, 2 Drawing Sheets

US 12,266,482 B2

ELECTROLYTIC CAPACITOR AND METHOD FOR PRODUCING SAME

BACKGROUND

1. Technical Field

The present disclosure relates to an electrolytic capacitor and a method for manufacturing the electrolytic capacitor.

2. Description of the Related Art

As capacitors having a small size, a large capacitance, and a low equivalent series resistance (ESR), promising candidates are electrolytic capacitors including an anode body on which a dielectric layer is formed, and a conductive polymer covering at least a part of the dielectric layer. As the conductive polymer, poly (3,4-ethylenedioxythiophene) (PEDOT) obtained by polymerizing 3,4-ethylenedioxythiophene (EDOT) is widely used (see, JP 2013-539806 A, JP 2013-243393 A, etc.).

Note that International Publication WO 2013/094462 proposes an electrolytic capacitor including a conductive polymer and a conductive auxiliary liquid, the conductive auxiliary liquid including a high-boiling point organic solvent having a boiling point of 150° C. or higher and an aromatic compound having at least one hydroxy group.

SUMMARY

An electrolytic capacitor according to a first aspect of the present disclosure includes a capacitor element that includes an anode body including a dielectric layer on a surface of the anode body, and a conductive polymer covering a part of the dielectric layer. The conductive polymer contains a first monomer unit corresponding to a 3,4-ethylenedioxythiophene compound and a second monomer unit corresponding to a 3,4-dialkoxythiophene compound.

A method for manufacturing an electrolytic capacitor according to a second aspect of the present disclosure includes: a first step of preparing an anode body; a second step of forming a dielectric layer on a surface of the anode body; and a third step of treating the anode body with a treatment liquid containing a conductive polymer or a precursor of the conductive polymer, the dielectric layer being formed on the anode body. The conductive polymer contains a first monomer unit corresponding to a 3,4-ethylenedioxythiophene compound and a second monomer unit corresponding to a 3,4-dialkoxythiophene compound. The precursor contains at least one of a 3,4-ethylenedioxythiophene compound and an oligomer of a 3,4-ethylenedioxythiophene compound and at least one of a 3,4-dialkoxythiophene compound and an oligomer of a 3,4-dialkoxythiophene compound. Alternatively, the precursor contains an oligomer containing a first monomer unit corresponding to a 3,4-ethylenedioxythiophene compound and a second monomer unit corresponding to a 3,4-dialkoxythiophene compound.

According to the present disclosure, high electrostatic capacity can be secured in an electrolytic capacitor including a conductive polymer containing a monomer unit corresponding to a 3,4-ethylenedioxythiophene compound.

DETAILED DESCRIPTIONS OF EMBODIMENT

Figure 1:
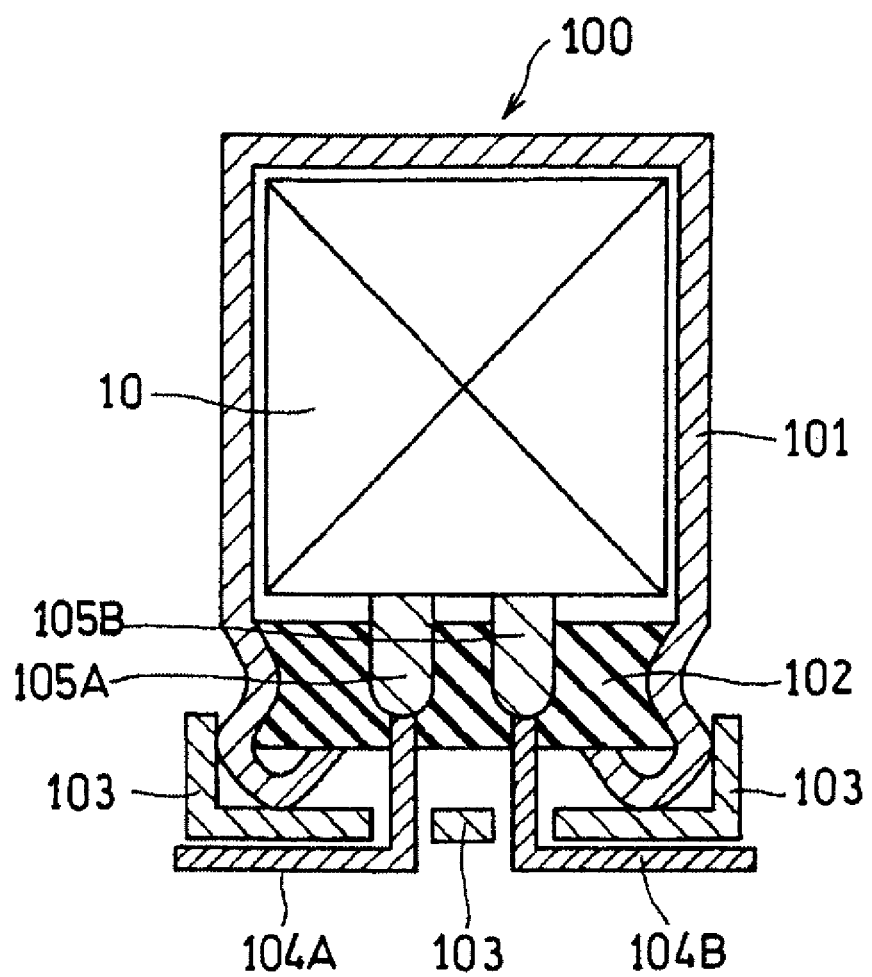
FIG. 1 is a schematic cross-sectional view illustrating an electrolytic capacitor according to an exemplary embodiment of the present disclosure.

In an electrolytic capacitor using PEDOT or the like shown in the background art, capacitance is required to be further increased.

A polymer such as PEDOT obtained by polymerizing a 3,4-ethylenedioxythiophene compound exhibits relatively high conductivity, and thus is used as a conductive polymer in an electrolytic capacitor including a solid electrolyte layer (conductive polymer layer). However, even in an electrolytic capacitor using such a conductive polymer, further increase in capacitance is demanded.

According to one aspect of the present disclosure, a conductive polymer containing a first monomer unit corresponding to a 3,4-ethylenedioxythiophene compound and a second monomer unit corresponding to a 3,4-dialkoxythiophene compound is used. By using such a conductive polymer, a high electrostatic capacity can be secured as compared with the case of using a conventional conductive polymer such as PEDOT. Further, a dielectric dissipation factor tan δ can be kept low, and the quality of the electrolytic capacitor can be further stabilized. In an electrolytic capacitor using a conventional conductive polymer such as PEDOT, ESR tends to increase when the electrolytic capacitor is exposed to a high temperature. On the other hand, when a conductive polymer containing a first monomer unit and a second monomer unit is used, a change ratio in ESR when exposed to a high temperature can be reduced.

Note that, even when a conductive polymer containing the first monomer unit and a 3-methoxythiophene unit or a 3,4-dimethylthiophene unit, which is used in place of the second monomer unit, the effect of improving electrostatic capacity and the effect of reducing tan δ or the change ratio in ESR cannot be obtained.

Details of the reason why the use of the conductive polymer containing the first monomer unit and the second monomer unit improves the electrostatic capacity or reduces the dielectric dissipation factor tan δ or the change ratio in ESR when exposed to a high temperature are not clear, but it is presumed that the reason is as follows. Since the dielectric layer is formed on a porous surface of the anode body, the dielectric layer is formed along inner wall surfaces of holes and hollows (pits) in the surface of the anode body. It is considered that when the conductive polymer contains the second monomer unit in addition to the first monomer unit, the affinity of the conductive polymer for the dielectric layer is improved, and the covering property by the conductive polymer to the dielectric layer is enhanced even in holes and pits on the surface of the anode body. When the conductive polymer layer is formed using the treatment liquid containing the conductive polymer, it is considered that the covering property can be improved by the fact that the conductive polymer contains the second monomer unit, thereby improving the impregnation property into holes and pits on the surface of the anode body. Further, when the conductive polymer contains the second monomer unit in addition to the first monomer unit, it is considered that the conductivity of the conductive polymer contained in the capacitor element is improved by improving an orientation of the conductive polymer. It is considered that when the conductive polymer contains the first monomer unit and the second monomer unit, dedoping of a dopant is suppressed and thermal stability of the conductive polymer is improved. This is considered to maintain high conductivity of a conductive polymer layer even after the electrolytic capacitor is exposed to a high temperature.

Hereinafter, a configuration of the electrolytic capacitor and a method for manufacturing the electrolytic capacitor will be described in more detail.

[Electrolytic Capacitor]

The electrolytic capacitor includes a capacitor element. The electrolytic capacitor may further include a liquid component.

(Capacitor Element)

The capacitor element includes at least an anode body that includes a dielectric layer on a surface of the anode body, and a conductive polymer that covers a part of the dielectric layer.

(Anode Body)

The anode body may include a valve metal, an alloy containing the valve metal, a compound containing the valve metal, or the like. These materials can be used singly or in combination of two or more kinds thereof. As the valve metal, for example, aluminum, tantalum, niobium, and titanium are preferably used. The anode body having a porous surface can be obtained, for example, by roughening a surface of a base material (such as a foil-shaped or plate-shaped base material) containing the valve metal by etching or the like. Further, the anode body may be a molded body of particles that contain the valve metal or a sintered body of the molded body. Note that the sintered body has a porous structure.

(Dielectric Layer)

The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on a porous surface of the anode body, the dielectric layer is formed along inner wall surfaces of holes and hollows (pits) in the surface of the anode body.

The dielectric layer contains an oxide of a valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer may be used as long as the dielectric layer functions as a dielectric material. When the surface of the anode body is porous, the dielectric layer is formed along the surface of the anode body (including inner wall surfaces of holes and pits).

(Conductive Polymer Layer)

The conductive polymer is attached to cover a part of the dielectric layer so as to form a conductive polymer layer. The conductive polymer constitutes at least a part of the cathode body in the electrolytic capacitor. The conductive polymer layer may further contain at least one of a dopant and an additive agent as necessary. As the conductive polymer, a polymer containing a first monomer unit corresponding to a 3,4-ethylenedioxythiophene compound and a second monomer unit corresponding to a 3,4-dialkoxythiophene compound is used.

Examples of the 3,4-ethylenedioxythiophene compound include EDOT or a substituted product thereof (specifically, EDOT having a substituent (first substituent)). Examples of the first substituent include a hydrocarbon group (an alkyl group ($C_{1-4}$ alkyl groups (methyl group, ethyl group, etc.), etc.), a cycloalkyl group, an aryl group, an aralkyl group, and the like), an alkoxy group ($C_{1-4}$ alkoxy groups (methoxy group, ethoxy group, and the like), etc.), an alkylthio group, a carbonyl group, a thiocarbonyl group, a sulfoxide group, a sulfonic acid group, a sulfonate group, an amino group, a formyl group, a carboxylic acid ester group (acyloxy groups, alkoxycarbonyl groups, etc.), an acyl group, a carboxy group, a carbonate group, a cyano group, an alkylsilyl group, an alkoxysilyl group, and a carboxylic acid amide group (such as an acylamino group). EDOT may have one or two or more of these substituents. When EDOT has a substituent, among these substituents, at least one of an alkyl group or an alkoxy group is preferable.

The conductive polymer may contain one kind or two or more kinds of the first monomer unit.

Examples of the 3,4-dialkoxythiophene compound include 3,4-dialkoxythiophene. Examples of the alkoxy group contained in the 3,4-dialkoxythiophene compound include a $C_{1-4}$ alkoxy group, and may be a $C_{1-3}$ alkoxy group or a $C_{1-2}$ alkoxy group. The alkoxy group may be either a linear chain or a branched chain. Specific examples of the alkoxy group include a methoxy group, an ethoxy group, a propoxy group, an isopropoxy group, an n-butoxy group, and a t-butoxy group. The alkoxy groups at a 3-position of the thiophene ring may be the same as or different from the alkoxy groups at a 4-position of the thiophene ring.

The conductive polymer may contain one kind or two or more kinds of the second monomer unit.

A ratio of the second monomer unit in the conductive polymer may be, for example, in a range from 0.005 parts by mass to 15 parts by mass, inclusive, and may be in a range from 0.008 parts by mass to 10 parts by mass, inclusive, with respect to 100 parts by mass of the first monomer unit. When the ratio of the second monomer unit is in such a range, higher electrostatic capacity is easily obtained. From the viewpoint of obtaining a lower dielectric dissipation factor tan δ and ESR, the ratio of the second monomer unit is preferably in a range from 0.01 parts by mass to 5 parts by mass, inclusive, with respect to 100 parts by mass of the first monomer unit.

The conductive polymer may contain a third monomer unit other than the first monomer unit and the second monomer unit. From the viewpoint of easily securing higher electrostatic capacity, a total molar proportion of the first monomer unit and the second monomer unit in the conductive polymer is preferably 90 mol % or more. A total molar proportion of the first monomer unit and the second monomer unit in the conductive polymer is 100 mol % or less.

As the dopant, for example, at least one selected from the group consisting of an anion and a polyanion is used.

Examples of the anion include, but are not particularly limited to, a sulfate ion, a nitrate ion, a phosphate ion, a borate ion, an organic sulfonate ion, and a carboxylate ion. Examples of the dopant that generates sulfonate ions include para-toluenesulfonic acid and naphthalenesulfonic acid.

Specific examples of the polyanion include polyvinylsulfonic acid, polystyrenesulfonic acid, polyallylsulfonic acid, polyacryl sulfonic acid, polymethacrylsulfonic acid, poly(2-acrylamido-2-methylpropanesulfonic acid), polyisoprenesulfonic acid, and polyacrylic acid. These may be used alone or may be used in combination of two or more kinds. Further, these may be a polymer of a single monomer or a copolymer of two or more kinds of monomers. Among them, a polyanion derived from polystyrenesulfonic acid is preferred.

The conductive polymer layer may be a single layer or may be formed of a plurality of layers. When the conductive polymer layer includes a plurality of layers, the composition (for example, the type, amount, and the like of each monomer) of the conductive polymer included in each of the plurality of layers may be the same or different.

Similarly to the anode body, a metal foil may be used for the cathode body. The type of the metal is not particularly limited, but it is preferable to use a valve metal such as aluminum, tantalum, or niobium or an alloy containing the valve metal. A surface of the metal foil may be roughened as necessary. On the surface of the metal foil may be provided an anodization film, a film of a metal (different type of metal) different from the metal that constitutes the metal foil, or a nonmetal film. Examples of the different type of metal and the nonmetal include metals such as titanium and nonmetals such as carbon.

(Separator)

When the metal foil is used for the cathode body, a separator may be disposed between the metal foil and the anode body. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The electrolytic capacitor may be a wound type, or may be either a chip type or a stacked type. The configuration of the capacitor element may be selected in accordance with the type of the electrolytic capacitor.

(Liquid Component)

When the electrolytic capacitor contains a liquid component, it is advantageous in securing higher electrostatic capacity. Further, the change ratio in ESR after the electrolytic capacitor is exposed to a high temperature can be further reduced.

The liquid component contains a solvent. Examples of the solvent include a sulfone compound, a lactone compound, a carbonate compound, and a polyhydric alcohol. The solvent may be used singly or in combination of two or more kinds thereof.

Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate.

It is preferable to use a liquid component containing a polyhydric alcohol from the viewpoint of having a higher effect of suppressing an increase in the change ratio in ESR after the electrolytic capacitor is exposed to a high temperature. A proportion of the polyhydric alcohol in the entire solvent contained in the liquid component is, for example, 50 mass % or more, and may be 75 mass % or more or 90 mass % or more. The proportion of the polyhydric alcohol in the entire solvent contained in the liquid component is 100 mass % or less.

Examples of the polyhydric alcohol include a glycerin compound, a sugar alcohol compound, and a glycol compound.

Examples of the glycerin compound include glycerin, polyglycerin (diglycerin, triglycerin, etc.), and derivatives thereof. The repeating number of the glycerin unit in the polyglycerin is, for example, in a range from 2 to 20, inclusive, and may be in a range from 2 to 10, inclusive. Examples of the sugar alcohol compound include sugar alcohols (erythritol, mannitol, pentaerythritol, and the like) and derivatives thereof. Examples of the derivative include alkylene oxide adducts (adducts in which one alkylene oxide is added to one hydroxy group of glycerin, polyglycerin, or sugar alcohol, and the like). Examples of the alkylene oxide adduct include $C_{2-4}$ alkylene oxide adducts (such as ethylene oxide adducts).

Examples of the glycol compound include an alkylene glycol ($C_{2-4}$ alkylene glycol (ethylene glycol, propylene glycol, etc.), and the like), a polyalkylene glycol (poly $C_{2-4}$ alkylene glycol (diethylene glycol, dipropylene glycol, triethylene glycol, polyethylene glycol, etc.), and the like), and a polyalkylene oxide adduct (such as a poly $C_{2-4}$ alkylene oxide adduct (such as a polyethylene oxide adduct)) of a sugar alcohol (glycerin, erythritol, mannitol, pentaerythritol, and the like).

The weight-average molecular weight (Mw) of the polyalkylene oxide adduct of the polyalkylene glycol or the sugar alcohol is, for example, in a range from 150 to 3000, inclusive, and may be in a range from 200 to 1000, inclusive. Mw is a value in terms of polystyrene measured by gel permeation chromatography (GPC). Note that usually, GPC is measured using a polystyrene gel column, and water and methanol (volume ratio 8:2) that form a mobile phase.

(Solute)

The liquid component may include a solute. Examples of the solute include an acid component and a base component.

Examples of the acid component include carboxylic acids (aliphatic carboxylic acid, aromatic carboxylic acid (a polycarboxylic acid such as phthalic acid or pyromellitic acid), and the like), sulfur-containing acids (sulfuric acid, sulfonic acid (aliphatic sulfonic acid, aromatic sulfonic acid, etc.), and the like), boron-containing acids (boric acid, halogenated boric acid (such as tetrafluoroboric acid), or partial esters thereof, and the like), phosphorus-containing acids (phosphoric acid, halogenated phosphoric acid (such as hexafluorophosphoric acid), phosphonic acid, phosphinic acid, or partial esters thereof), nitric acid, and nitrous acid. As the acid component, a condensation product (borodisalicylic acid, borodiglycolic acid, borodioxalic acid, and the like) of a carboxylic acid and an inorganic acid (boric acid, phosphoric acid, etc.) may be used. The aromatic sulfonic acid also contains an aromatic sulfonic acid including a hydroxy group or a carboxy group (oxyaromatic sulfonic acid (e.g. phenol-2-sulfonic acid), sulfoaromatic carboxylic acid (e.g. p-sulfobenzoic acid, 3-sulfophthalic acid, 5-sulfosalicylic acid), and the like) in addition to a sulfo group. The liquid component may contain one acid component or two or more kinds of acid components.

Examples of the base component include ammonia, amine (specifically, primary amine, secondary amine, or tertiary amine), a quaternary ammonium compound, and an amidinium compound. The amine may be any of aliphatic, aromatic, and heterocyclic. Examples of the amine include trimethylamine, diethylamine, triethylamine, ethylenediamine, aniline, pyrrolidine, imidazole, and 4-dimethylaminopyridine. Examples of the quaternary ammonium compound include amidine compounds (also containing imidazole compounds). The liquid component may include one kind or two or more kinds of base components.

The liquid component may include the acid component and the base component in a free state or in a salt form, respectively. The liquid component may include an organic salt. Examples of the organic salt include those in which at least one of the acid component and the base component is organic.

The pH of the liquid component is preferably 4 or less, and may be 3.8 or less or 3.6 or less. When the pH of the liquid component is in such a range, deterioration of the conductive polymer is easily suppressed. The pH is preferably 1.0 or more.

The concentration of the solute in the liquid component is, for example, in a range from 0.1 mass % to 25 mass %, inclusive, and may be in a range from 0.5 mass % to 15 mass %, inclusive. When the concentration of the solute is in such a range, dedoping of the dopant is easily suppressed.

Figure 2:
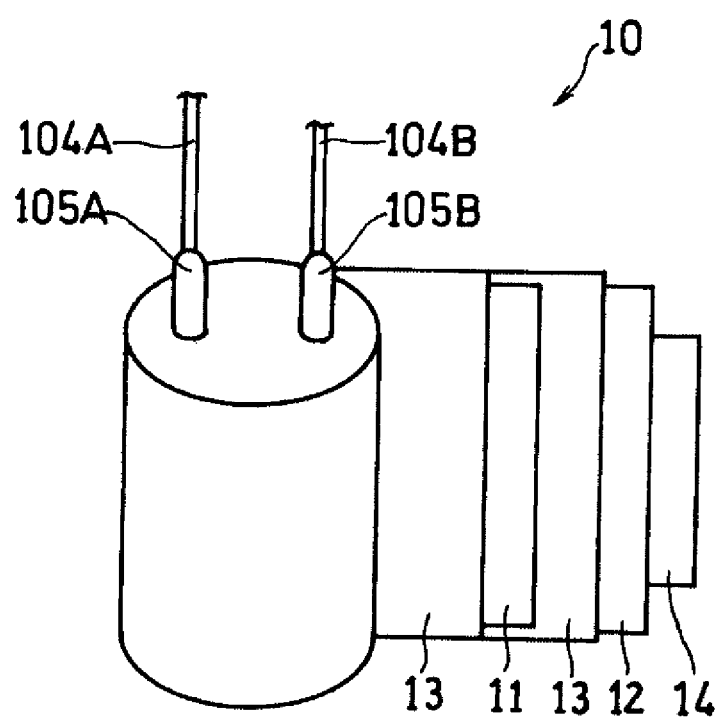
FIG. 2 is a partially developed schematic view illustrating a capacitor element of the electrolytic capacitor in FIG. 1.

FIG. 1 is a schematic cross-sectional view illustrating an electrolytic capacitor according to the present exemplary embodiment, and FIG. 2 is a schematic view illustrating a partially developed capacitor element of the electrolytic capacitor.

The electrolytic capacitor 100 includes, for example, capacitor element 10, bottomed case 101 that houses capacitor element 10 and a liquid component (not illustrated), sealing body 102 that closes an opening of bottomed case 101, base plate 103 that covers sealing body 102, lead wires 104A, 104B led out from sealing body 102 and penetrating base plate 103, and lead tabs 105A, 105B connecting the lead wires and the electrodes of capacitor element 10. The vicinity of an opening end of bottomed case 101 is drawn inward, and the opening end is curled to swage to sealing body 102.

Capacitor element 10 is, for example, a wound body as illustrated in FIG. 2. The wound body includes anode body 11 connected to lead tab 105A, cathode body 12 connected to lead tab 105B, and separator 13. A conductive polymer layer (not illustrated) is formed on anode body 11. At least the conductive polymer layer of capacitor element 10 may be impregnated with the liquid component.

Anode body 11 and cathode body 12 are wound with separator 13 interposed between anode body 11 and cathode body 12. An outermost circumference of the wound body is fixed with winding stop tape 14. Note that FIG. 2 illustrates a state in which a part of the wound body is developed before the outermost circumference of the wound body is fastened.

The electrolytic capacitor may include at least one capacitor element, and may include a plurality of capacitor elements. The number of capacitor elements included in the electrolytic capacitor may be determined in accordance with application.

[Method for Manufacturing Electrolytic Capacitor]

An electrolytic capacitor is manufactured by a manufacturing method including at least a step of preparing an anode body, a step of forming a dielectric layer, and a step of treating the anode body with a treatment liquid containing a conductive polymer or a precursor thereof.

Hereinafter, an example of a method of manufacturing an electrolytic capacitor will be described.

(i) Step of Preparing Anode Body 11 (First Step) and Step of Forming Dielectric Layer (Second Step)

As a raw material of anode body 11, a metal foil formed of a valve metal is used. In the case of anode body 11, a surface of the metal foil is roughened by an etching treatment or the like, so that a plurality of recesses and projections are formed on the surface of the metal foil. Anode body 11 is thus prepared. Next, a dielectric layer is formed on the roughened surface of the metal foil by an anodizing treatment or the like.

(ii) Step of Preparing Cathode Body 12

As a raw material of cathode body 12, a metal foil formed of a valve metal is used. A surface of cathode body 12 may be roughened as necessary.

(iii) Production of Wound Body

Anode body 11 and cathode body 12 are wound with separator 13 interposed between anode body 11 and cathode body 12 to produce a wound body. Winding stop tape 14 is disposed on an outer surface of cathode body 12 positioned on an outermost layer of the wound body to fix an end part of cathode body 12. As necessary, the anodizing treatment is further performed on the wound body.

(iv) Step of Treating Anode Body 11 with Treatment Liquid (Third Step)

In the third step, a treatment liquid containing a conductive polymer or a precursor thereof may be brought into contact with at least the dielectric layer. For example, the treatment liquid can be brought into contact with at least the dielectric layer by immersing the anode body on which the dielectric layer is formed in the treatment liquid or injecting the treatment liquid into the anode body on which the dielectric layer is formed. By bringing the treatment liquid into contact with the dielectric layer, a film of the conductive polymer covering at least a part of the dielectric layer is formed. For example, when the wound body is used, the treatment liquid is applied to the wound body to obtain capacitor element 10 in which the conductive polymer is disposed between anode body 11 and cathode body 12.

When the treatment liquid containing a precursor of the conductive polymer is used, it is preferable to generate the conductive polymer by immersing the anode body and polymerizing the precursor by chemical polymerization or electrolytic polymerization. The anode body is usually dried after being taken out from the treatment liquid. During the drying, the anode body may be heated as necessary. The anode body taken out from the treatment liquid may be washed as necessary prior to the drying. In this way, the conductive polymer layer is formed.

When the treatment liquid containing the conductive polymer is used, for example, the treatment liquid is brought into contact with at least the dielectric layer of the anode body and dried. In this way, the conductive polymer layer is formed. During the drying, the anode body may be heated as necessary.

The treatment liquid is prepared by dissolving or dispersing constituent components of the treatment liquid in a liquid medium. Examples of the constituent component include a conductive polymer or a precursor thereof, a dopant, and an additive agent. For the conductive polymer and the dopant, the description of the conductive polymer layer can be referred to.

Examples of the precursor of the conductive polymer include a monomer and an oligomer (including a prepolymer) of the conductive polymer. The treatment liquid may contain one kind or two or more kinds of precursors. The precursor may contain at least one of a 3,4-ethylenedioxythiophene compound (first monomer) and an oligomer thereof (first oligomer), and at least one of a 3,4-dialkoxythiophene compound (second monomer) and an oligomer thereof (second oligomer). Alternatively, the precursor may contain an oligomer (third oligomer) containing a first monomer unit and a second monomer unit. The precursor may contain the third oligomer, and at least one selected from the group consisting of the first monomer, the first oligomer, the second monomer, and the second oligomer. For each monomer or unit thereof, the description of the conductive polymer layer can be referred to.

A ratio of each monomer or oligomer in the precursor may be determined so that the ratio of the second monomer unit with respect to 100 parts by mass of the first monomer unit in the conductive polymer falls within the above-mentioned range. For example, when the first monomer and the second monomer are used as the precursors, a ratio of the second monomer with respect to 100 parts by mass of the first monomer may be in the above-described range described as the ratio of the second monomer unit with respect to 100 parts by mass of the first monomer unit.

Examples of the liquid medium contained in the treatment liquid include water, an organic medium, and a mixture thereof. Examples of the organic medium include aliphatic alcohols, aliphatic ketones (such as acetone), nitriles (such as acetonitrile), amides (N,N-dimethylformamide, etc.), and sulfoxides (such as dimethyl sulfoxide). As the aliphatic alcohol, an aliphatic alcohol having 1 to 5 carbon atoms is preferably used. The aliphatic alcohol may be either monool or polyol. Examples of the aliphatic monool include methanol, ethanol, propanol, and butanol. Examples of the aliphatic polyol include ethylene glycol and glycerin.

The treatment liquid can contain a known additive agent used in forming the conductive polymer layer. As such an additive agent, a silane compound may be used.

When the treatment liquid containing the precursor of the conductive polymer is used, an oxidizing agent is used to polymerize the precursor. The oxidizing agent may be contained in the treatment liquid as an additive agent. Further, the oxidizing agent may be applied to the anode body before or after the treatment liquid is brought into contact with the anode body on which the dielectric layer is formed. Examples of such an oxidizing agent include a sulfate, a sulfonic acid, and a salt thereof. The oxidizing agent may be used singly or in combination of two or more kinds thereof.

Examples of the sulfate include a salt of a metal and a sulfuric acid such as ferric sulfate or sodium persulfate or a sulfuric acid group such as persulfuric acid. Examples of the metal constituting the salt include alkali metals (sodium, potassium, etc.), iron, copper, chromium, and zinc. The sulfonic acid or a salt of the sulfonic acid has a function as a dopant in addition to a function as the oxidizing agent. As the sulfonic acid or a salt of the sulfonic acid, a low molecular sulfonic acid or a salt of the low molecular sulfonic acid exemplified as the dopant can be used.

The step of forming the conductive polymer layer by immersion in the treatment liquid and polymerization (or drying) may be performed once, or may be repeated a plurality of times. In each time, conditions such as the composition and viscosity of the treatment liquid may be the same, or at least one condition may be changed.

(v) Liquid Component Impregnation Step

In this step, capacitor element 10 may be impregnated with the liquid component. It is thus possible to achieve an electrolytic capacitor including the conductive polymer and the liquid component. This step is performed after the third step. The liquid component may be impregnated into capacitor element 10 by, for example, housing capacitor element 10 and the liquid component in a container, may be impregnated by immersing capacitor element 10 in the liquid component, or may be impregnated by dropping the liquid component into capacitor element 10.

The liquid component is prepared prior to the present step. The liquid component can be prepared by mixing the constituent components.

(vi) Step of Sealing Capacitor Element 10

Capacitor element 10 is housed in bottomed case 101 so that lead wires 104A, 104B are positioned on an opening side of bottomed case 101. The liquid component is also housed in bottomed case 101. Next, the opening of bottomed case 101 is closed by sealing body 102 through which each lead wire passes, an opening end is caulked to sealing body 102 to perform curling processing, and base plate 103 is disposed at a curled part, whereby the electrolytic capacitor as illustrated in FIG. 1 is completed.

In the above exemplary embodiment, the wound electrolytic capacitor has been described, but an application range of the present disclosure is not limited to the above, and the present disclosure can also be applied to other electrolytic capacitors, for example, a chip electrolytic capacitor using a metal sintered body as an anode body, or a stacked electrolytic capacitor using a metal plate as an anode body.

EXAMPLES

Hereinafter, the present disclosure will be specifically described with reference to examples and comparative examples, but the present disclosure is not limited to the following examples.

<<Production of Electrolytic Capacitors E1 to E12 and C1 to C6>>

[Manufacturing of Electrolytic Capacitor]

A wound electrolytic capacitor (diameter of 10 mm×length (L) of 10 mm) having a rated voltage of 25 V and a rated capacitance of 330 µF was produced. A specific method for manufacturing an electrolytic capacitor will be described below.

(Preparation of Anode Body)

An aluminum foil having a thickness of 100 µm was subjected to an etching treatment to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 180 V to the aluminum foil. Then, the aluminum foil was cut to prepare an anode body.

(Preparation of Cathode Body)

An aluminum foil having a thickness of 50 µm was subjected to an etching treatment to roughen a surface of the aluminum foil. Then, the aluminum foil was cut to prepare a cathode body.

(Production of Wound Body)

An anode lead tab and a cathode lead tab were connected to the anode body and the cathode body, respectively, and the anode body and the cathode body were wound with a separator interposed between the anode body and the cathode body while winding the lead tabs. An anode lead wire and a cathode lead wire were connected to the end parts of the lead tabs protruding from the wound body, respectively. The produced wound body was subjected to an anodizing treatment again to form a dielectric layer on the cutting end part of the anode body. Next, the end part of the outer surface of the wound body was fixed with a winding stop tape to produce the wound body.

(Preparation of Polymer Dispersion)

The first monomer shown in Table 1 and, if necessary, another monomer (the second monomer or the third monomer), and polystyrenesulfonic acid (PSS, weight-average molecular weight 100,000) as a polymer dopant were dissolved in ion-exchanged water to prepare a mixed solution. When another monomer was used, a ratio of the other monomer was set to a ratio shown in Table 1 with respect to 100 parts by mass of the first monomer.

While the mixed solution was being stirred, iron(III) sulfate (oxidizing agent) dissolved in ion-exchanged water was added to perform a polymerization reaction. After the reaction, the obtained reaction solution was dialyzed to remove unreacted monomers and an excessive oxidizing agent, thereby obtaining a polymer dispersion that contains a polymer containing the first monomer unit doped with about 5% by mass PSS (and the second monomer unit or the third monomer unit as necessary).

(Formation of Conductive Polymer Layer)

The wound body was immersed in the polymer dispersion housed in a predetermined container for 5 minutes in a decompressed atmosphere (40 kPa), and then the wound body was pulled out from the polymer dispersion. Next, the wound body impregnated with the polymer dispersion was dried in a drying furnace at 150° C. for 20 minutes to form a conductive polymer layer covering at least a part of the dielectric layer. In this way, a capacitor element was formed.

(Assembling of Electrolytic Capacitor)

The capacitor element was housed in a case together with a liquid component shown in Table 1 as necessary, and an opening part of the case was sealed using a sealing body to complete an electrolytic capacitor as illustrated in FIG. 1. When a liquid component was used, 200 mg of the liquid component was housed in the case, and the capacitor element was impregnated with the liquid component in a decompressed atmosphere (40 kPa) over 5 minutes. The assembled electrolytic capacitor was subjected to an aging treatment at 130° C. for 2 hours while a rated voltage was applied.

[Evaluation]

(Measurement of Electrostatic Capacity, Tan δ, and ESR)

Under an environment of 20° C., initial electrostatic capacity (μF), tan δ, and ESR (mΩ) at a frequency of 100 kHz/Ω of the obtained electrolytic capacitor were measured using an LCR meter. Further, to evaluate long-term reliability, the obtained electrolytic capacitor was held at 145° C. for 2000 hours while a rated voltage was applied, and an increasing ratio (ΔESR) of ESR was confirmed. The ΔESR was represented by a ratio ($Z/Z_0 \times 100\%$) of the ESR(Z) of the electrolytic capacitor after retention at 145° C. to an initial $ESR(Z_0)$. The ESR(Z) was measured in the same manner as in the initial ESR using the electrolytic capacitor held at 145° C.

Evaluation results are shown in Table 1. In Table 1, E1 to E12 are examples, and C1 to C6 are comparative examples.

TABLE 1

| | First monomer | Another monomer | | Ratio of the other monomer (parts by mass) | Liquid component | Initial characteristics | | | Reliability evaluation ΔESR (%) |
|---|---|---|---|---|---|---|---|---|---|
| | | Second monomer | Third monomer | | | Electrostatic capacity (μF) | tan δ | ESR (mΩ) | |
| E1 | EDOT | DMOT | — | 0.5 | GL | 330 | 0.045 | 15.3 | 135 |
| E2 | EDOT | DMOT | — | 0.008 | GL | 319 | 0.056 | 15.5 | 136 |
| E3 | EDOT | DMOT | — | 0.01 | GL | 325 | 0.048 | 15.3 | 136 |
| E4 | EDOT | DMOT | — | 0.05 | GL | 327 | 0.047 | 15.3 | 135 |
| E5 | EDOT | DMOT | — | 0.1 | GL | 328 | 0.047 | 15.3 | 135 |
| E6 | EDOT | DMOT | — | 1 | GL | 333 | 0.043 | 15.4 | 136 |
| E7 | EDOT | DMOT | — | 5 | GL | 335 | 0.042 | 15.5 | 136 |
| E8 | EDOT | DMOT | — | 6 | GL | 335 | 0.042 | 17.1 | 139 |
| E9 | EDOT | DMOT | — | 10 | GL | 336 | 0.042 | 17.6 | 149 |
| E10 | EDOT | DMOT | — | 0.5 | PEG | 328 | 0.045 | 15.5 | 140 |
| E11 | EDOT | DMOT | — | 0.5 | GBL | 325 | 0.049 | 15.7 | 185 |
| E12 | EDOT | DMOT | — | 0.5 | — | 316 | 0.048 | 15.6 | 210 |
| C1 | EDOT | — | DMT | 0.5 | GL | 304 | 0.075 | 15.9 | 190 |
| C2 | EDOT | — | MOT | 0.5 | GL | 301 | 0.077 | 16.0 | 200 |
| C3 | EDOT | — | — | 0 | GL | 308 | 0.075 | 15.6 | 185 |
| C4 | EDOT | — | DMT | 0.5 | — | 285 | 0.083 | 16.1 | 260 |
| C5 | EDOT | — | MOT | 0.5 | — | 283 | 0.086 | 16.2 | 265 |
| C6 | EDOT | — | — | 0 | — | 288 | 0.081 | 15.8 | 250 |

EDOT: 3,4-ethylenedioxythiophene

DMOT: 3,4-dimethoxythiophene

DMT: 3,4-dimethylthiophene

MOT: 3-methoxythiophene

GL: glycerin

PEG: polyethylene glycol (Mw = 300)

GBL: γ-butyrolactone

The electrolytic capacitor of the present disclosure can be used as a solid electrolytic capacitor or a hybrid electrolytic capacitor. The electrolytic capacitor is also suitable for applications requiring high heat resistance. However, the application of the electrolytic capacitor is not limited thereto.

What is claimed is:

1. An electrolytic capacitor comprising a capacitor element and a liquid component,
   the capacitor element including:
   an anode body including a dielectric layer on a surface of the anode body, and
   a conductive polymer covering a part of the dielectric layer, wherein;
   the conductive polymer includes a first monomer unit corresponding to a 3,4-ethylenedioxythiophene compound and a second monomer unit corresponding to a 3,4-dialkoxythiophene compound, and
   a ratio of the second monomer unit in the conductive polymer ranges from 1.0 parts by mass to 15 parts by mass, inclusive, with respect to 100 parts by mass of the first monomer unit.

2. The electrolytic capacitor according to claim 1, wherein the liquid component contains at least one selected from the group consisting of a glycerin compound and a polyalkylene glycol compound.

3. The electrolytic capacitor according to claim 1, wherein the liquid component contains a solute.

4. The electrolytic capacitor according to claim 1, wherein the ratio of the second monomer unit in the conductive polymer ranges from 5.0 parts by mass to 15 parts by mass, inclusive, with respect to 100 parts by mass of the first monomer unit.

* * * * *